United States Patent
Shin et al.

(10) Patent No.: US 7,548,278 B2
(45) Date of Patent: Jun. 16, 2009

(54) SPATIO-TEMPORAL NOISE REMOVAL METHOD USING BLOCK CLASSIFICATION AND DISPLAY DEVICE USING THE SAME

(75) Inventors: Dong-hyuk Shin, Anyang-si (KR); Rae-hong Park, Seoul (KR)

(73) Assignees: Samsung Electronics Co., Ltd., Suwon-si (KR); Industry - University Cooperation Foundation Sogang Univ, Seoul (KR)

( * ) Notice: Subject to any disclaimer, the term of this patent is extended or adjusted under 35 U.S.C. 154(b) by 742 days.

(21) Appl. No.: 11/302,192

(22) Filed: Dec. 14, 2005

(65) Prior Publication Data

US 2006/0285020 A1    Dec. 21, 2006

(30) Foreign Application Priority Data

Jun. 15, 2005   (KR) ...................... 10-2005-0051632

(51) Int. Cl.
*H04N 5/21* (2006.01)
(52) U.S. Cl. ....................................... 348/607; 348/701
(58) Field of Classification Search ................. 348/607, 348/624, 618–620, 701; 382/260, 261, 275; *H04N 5/21*
See application file for complete search history.

(56) References Cited

U.S. PATENT DOCUMENTS 6,067,125 A * 5/2000 May ........................... 348/607

7,145,607 B1 * 12/2006 Hui ............................. 348/607

FOREIGN PATENT DOCUMENTS

| JP | 09-233369 A | 9/1997 |
| JP | 2005-026962 A | 1/2005 |
| KR | 10-0327385 B1 | 2/2002 |
| KR | 10-0327386 B1 | 2/2002 |

* cited by examiner

*Primary Examiner*—Sherrie Hsia
(74) *Attorney, Agent, or Firm*—Sughrue Mion, PLLC (57) ABSTRACT

A spatio-temporal noise removal method using block classification that removes noise from a third field by using first, second, and third fields which are continuously inputted. The method includes generating first, second, and third motion-compensated fields; classifying blocks of the third field into a uniform region and a non-uniform region based on a variance value of a generated difference image; performing temporal filtering over every block of the third field; performing spatio-temporal filtering over every block of the first and third motion-compensated fields and the third field and performing the temporal filtering over the every block of the third field based on spatially-filtered value; and outputting a third noise-removed field by applying a weighted value to the temporal-filtered value and the spatio-temporal-filtered value.

15 Claims, 3 Drawing Sheets

FIG. 1

FIG. 2 ized images by removing noise from a third field by using first, second, and third fields which are continuously inputted, comprising a motion calculation part for generating a first motion-compensated field being a motion-compensated field by using the third field and the second noise-removed field, for generating a second motion-compensated field by using the first and second noise-removed fields, and for generating a third motion-compensated field by using the second motion-compensated field and the third field; a classification part for classifying blocks of the third field into a uniform region and a non-uniform region based on a variance value of a generated difference image by using the third field and any of the first and second motion-compensated fields; a temporal filter for performing temporal filtering over every block of the third field based on the first and third motion-compensated fields, the third field, and the variance value; a spatio-temporal filter for performing spatio-temporal filtering by performing spatial filtering over every block of the first and third motion-compensated fields and the third field and performing the temporal filtering over the every block of the third field based on spatially-filtered value; and an arithmetic logic unit for outputting a third noise-removed field by applying a weight value to the temporal-filtered value and the spatio-temporal-filtered value, respectively, depending on whether a block in the third field is the uniform region or the non-uniform region.
SPATIO-TEMPORAL NOISE REMOVAL METHOD USING BLOCK CLASSIFICATION AND DISPLAY DEVICE USING THE SAME

CROSS-REFERENCE TO RELATED APPLICATIONS

This application claims benefit under 35 U.S.C. § 119 from Korean Patent Application 2005-51632, filed on Jun. 15, 2005, the entire contents of which are incorporated herein by reference.

BACKGROUND OF THE INVENTION

1. Field of the Invention

The present invention relates to a spatio-temporal noise removal method using block classification and a display device using the same for removing spatio-temporal noise by performing spatio-temporal filtering depending on whether a block in an image is a uniform region formed with similar pixel values.

2. Description of the Related Art

In the conventional image noise removal method, if a current field is inputted with noise, the conventional noise removal method removes the noise from the current field based on motion compensation or motion estimation calculated by using a previous field from which noise inputted prior to the current field has been removed.

In detail, the conventional image noise removal method calculates a motion vector between a current field and a noise-removed previous field, compensates for motion, and uses motion estimation between the current field and the noise-removed previous field. The motion-compensated field and a current field for noise removal are used for the one-dimensional temporal filtering or the three-dimensional spatio-temporal filtering. In this case, the finite impulse response (FIR) filter can be used at the time of the one-dimensional temporal filtering, and the infinite impulse response (IIR) filter can be used at the time of the three-dimensional spatio-temporal filtering.

However, at the time the temporal filter is used for noise removal, there exists a problem that noise appearing in space is not effectively removed. Further, at the time the spatial filter is used for noise removal, there exists a flickering problem of varying a brightness difference between fields continuous in time since time-dependent relationships between fields are not used.

Therefore, even a spatial filter for noise removal is required to use time information, and a noise removal method is required to remove noise by using a temporal filter and a spatial filter using time information, depending on a region of an image.

SUMMARY OF THE INVENTION

The present invention has been developed in order to solve the above drawbacks and other problems associated with the conventional arrangement and other disadvantages not described above. Also, the present invention is not required to overcome the disadvantages described above, and an illustrative, non-limiting embodiment of the present invention may not overcome any of the problems described above. An aspect of the present invention is to provide a spatio-temporal noise removal method and a display device using the same, capable of effectively removing noise by classifying an image into a uniform region having similar pixel values in a block of an image and a non-uniform region and then performing spatio-temporal filtering over the uniform region and temporal filtering over the non-uniform region.

The foregoing and other objects and advantages are substantially realized by providing a display device for display- Preferably, but not necessarily, the motion calculation part includes a first motion calculation unit for generating the first motion-compensated field being a motion-compensated field by using the third field and the second noise-removed field; a second motion-compensated unit for generating the second motion-compensated field being a motion-compensated field by using the first and second noise-removed fields; and a third motion calculation unit for generating the third motion-compensated field being a motion-compensated field by using the second motion-compensated field and the first noise-removed field.

Preferably, but not necessarily, the classification part includes an adder for generating a difference image by calculating a pixel value difference between the third field and any of the first and second motion-compensated fields; a noise estimation unit for estimating as noise a variance value having a maximum frequency after calculating a variance value over every block of the difference image; and a region classification unit for classifying as the uniform region a block having a variance value higher than the estimated noise.

Preferably, but not necessarily, the display device further comprises a weight value unit for generating a weight value in order for an output value of the spatio-temporal filter to be taken into more account than an output value of the temporal filter if an arbitrary block of the third field is the uniform region, and generating a weight value in order for the output value of the temporal filter to be taken into more account than the output value of the spatio-temporal filter.

Here, the arithmetic logic unit outputs the third noise-removed field by using an equation as below:

$$f(x, y, k) = w \times f_t(x, y, k) + (1+w) \times f_{s-t}(x, y, k),$$

in here, f(x, y, k) denotes the third noise-removed field, w and (1-w) denote a weight value applied to a temporal-filtered value and a weight value applied to a spatio-temporal filtered value, respectively, $f_t(x, y, k)$ denotes an output value of the temporal filter, and $f_{s-t}(x, y, k)$ denotes an output value of the spatio-temporal filter.

Further, the spatio-temporal filter performs the saptio-temporal filtering over every block of the third field by using an equation as below:

$$f_{s-t}(x, y, k) = \frac{1}{3}\{\hat{f}_1^s(x, y, k) + \hat{f}_2^s(x, y, k) + \hat{f}^s(x, y, k)\},$$

here, $f_{s-t}(x, y, k)$ denotes an output value of the spatio-temporal filter, $$\hat{f}_1^s(x, y, k), \hat{f}_2^s(x, y, k), \text{ and } \hat{f}^s(x, y, k)$$

denote spatially-filtered values over the first motion-compensated field, the third motion-compensated field, and the third field, respectively, and (x,y,k) denotes a pixel position.

Further, the temporal filter performing the temporal filtering over every block of the third field by using an equation below:

$$\hat{f}_t(x, y, k) = \frac{\sigma_f^2(x, y, k)}{\sigma_f^2(x, y, k) + \sigma_n^2(x, y, k)}$$

$$\{g(x, y, k) - E[g(x, y, k)]\} +$$

$$E[g(x, y, k)], \text{ here,}$$

$$E[g(x, y, k)] = \frac{1}{3}(g(x, y, k) + \hat{f}_1^{mc}(x, y, k) + \hat{f}_2^{mc}(x, y, k)),$$

$$\hat{f}_t(x, y, k)$$

denotes the temporal-filtered value, $g(x,y,k)$ the third field, $$\hat{f}_1^{mc}(x, y, k)$$

the first motion-compensated field, $$\hat{f}_2^{mc}(x, y, k)$$

the third motion-compensated field, (x,y,k) a pixel position in an arbitrary block, $\sigma_n^2$ a variance value of the uniform region, and $\sigma_f^2$ a variance value of a filtered block.

The spatio-temporal filter and the temporal filter are a Linear Minimum Mean Square Error (LMMSE) filter.

The foregoing and other objects and advantages are substantially realized by providing a spatio-temporal noise removal method using block classification for noise removal from a third field by using first, second, and third fields which are continuously inputted, comprising steps of generating a first motion-compensated field being a motion-compensated field by using the third field and the second noise-removed field, generating a second motion-compensated field by using the first and second noise-removed fields, and generating a third motion-compensated field by using the second motion-compensated field and the third field; classifying blocks of the third field into a uniform region and a non-uniform region based on a variance value of a generated difference image by using the third field and any of the first and second motion-compensated fields; performing temporal filtering over every block of the third field based on the first and third motion-compensated fields, the third field, and the variance value; performing spatio-temporal filtering by performing spatial filtering over every block of the first and third motion-compensated fields and the third field, and then performing the temporal filtering over the every block of the third field based on spatially-filtered value; and outputting a third noise-removed field by applying a weigh value to the temporal-filtered value and the spatio-temporal-filtered value, respectively, depending on whether a block in the third field is the uniform region or the non-uniform region.

Preferably, but not necessarily, the step of generating the motion-compensated field includes steps of generating the first motion-compensated field being a motion-compensated field by using the third field and the second noise-removed field; generating the second motion-compensated field being a motion-compensated field by using the first and second noise-removed fields; and generating the third motion-compensated field being a motion-compensated field by using the second motion-compensated field and the first noise-removed field.

Preferably, but not necessarily, the classification step includes steps of generating a difference image by calculating a pixel value difference between the third field and any of the first and second motion-compensated fields; estimating as noise a variance value having a maximum frequency after calculating a variance value over every block of the difference image; and classifying as the uniform region a block having a variance value larger than the estimated noise.

Preferably, but not necessarily, the spatio-temporal noise removal method further comprises a step of generating a weight value in order for an output value of the spatio-temporal filter to be taken into more account than an output value of the temporal filter if an arbitrary block of the third field is the uniform region, and generating a weight value in order for the output value of the temporal filter to be taken into more account than the output value of the spatio-temporal filter.

Further, the third noise-removed field is calculated by an equation as below:

$$f(x,y,k) = w \times f_t(x,y,k) + (1-w) \times f_{s-t}(x,y,k),$$

in here, $f(x,y,k)$ denotes the third noise-removed field, w and (1−w) denote a weight value applied to a temporal-filtered value and a weight value applied to a spatio-temporal-filtered value, respectively, $f_t(x,y,k)$ denotes a temporal-filtered value, and $f_{s-t}(x,y,k)$ denotes a spatio-temporal-filtered value.

Further, the step of performing the spatio-temporal filtering performs the spatio-temporal filtering over every block of the third field by using an equation as below:

$$\hat{f}_{s-t}(x, y, k) = \frac{1}{3}\{\hat{f}_1^s(x, y, k) + \hat{f}_2^s(x, y, k) + \hat{f}^s(x, y, k)\},$$

in here, $f_{s-t}(x,y,k)$, denotes a spatio-temporal-filtered value, $$\hat{f}_1^s(x, y, k), \hat{f}_2^s(x, y, k), \text{ and } \hat{f}^s(x, y, k)$$

denote spatially-filtered values over the first motion-compensated field, the third motion-compensated field, and the third field, respectively, and (x,y,k) denotes a pixel position.

Further, the step of performing the temporal filtering performs the temporal filtering over every block of the third field by using an equation as below:

$$\hat{f}_t(x, y, k) = \frac{\sigma_f^2(x, y, k)}{\sigma_f^2(x, y, k) + \sigma_n^2(x, y, k)}$$
$$\{g(x, y, k) - E[g(x, y, k)]\} +$$
$$E[g(x, y, k)], \text{ in here,}$$
$$E[g(x, y, k)] = \frac{1}{3}(g(x, y, k) + \hat{f}_1^{mc}(x, y, k) +$$
$$\hat{f}_2^{mc}(x, y, k)),$$
$$\hat{f}_t(x, y, k)$$

denotes the temporal-filtered value, g(x,y,k) the third field, $$\hat{f}_1^{mc}(x, y, k)$$

the first motion-compensated field, $$\hat{f}_2^{mc}(x, y, k)$$

the third motion-compensated field, (x,y,k) a pixel position in an arbitrary block, $\sigma_n^2$ a variance value of the uniform region, and $\sigma_f^2$ a variance value of a filtered block.

BRIEF DESCRIPTION OF THE DRAWINGS

The above aspects and features of the present invention will be more apparent by describing exemplary embodiments of the present invention with reference to the accompanying drawings.

DETAILED DESCRIPTION OF THE EXEMPLARY EMBODIMENTS

Hereinafter, the present invention will be described in detail with reference to the accompanying drawings.

Figure 1:
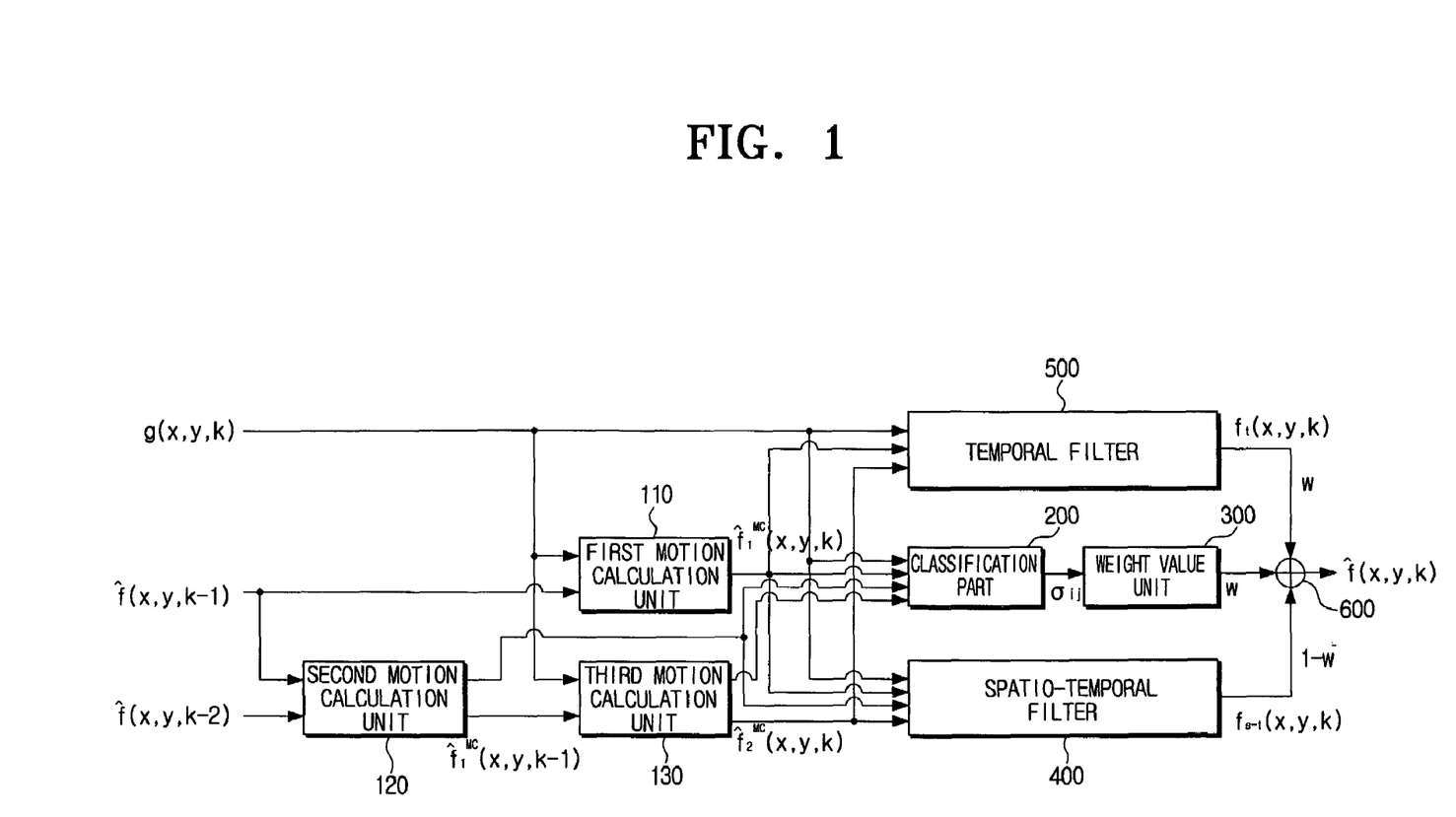
FIG. 1 is a block diagram for showing a display device using a spatio-temporal noise removal method using block classification according to an embodiment of the present invention.
Figure 2:
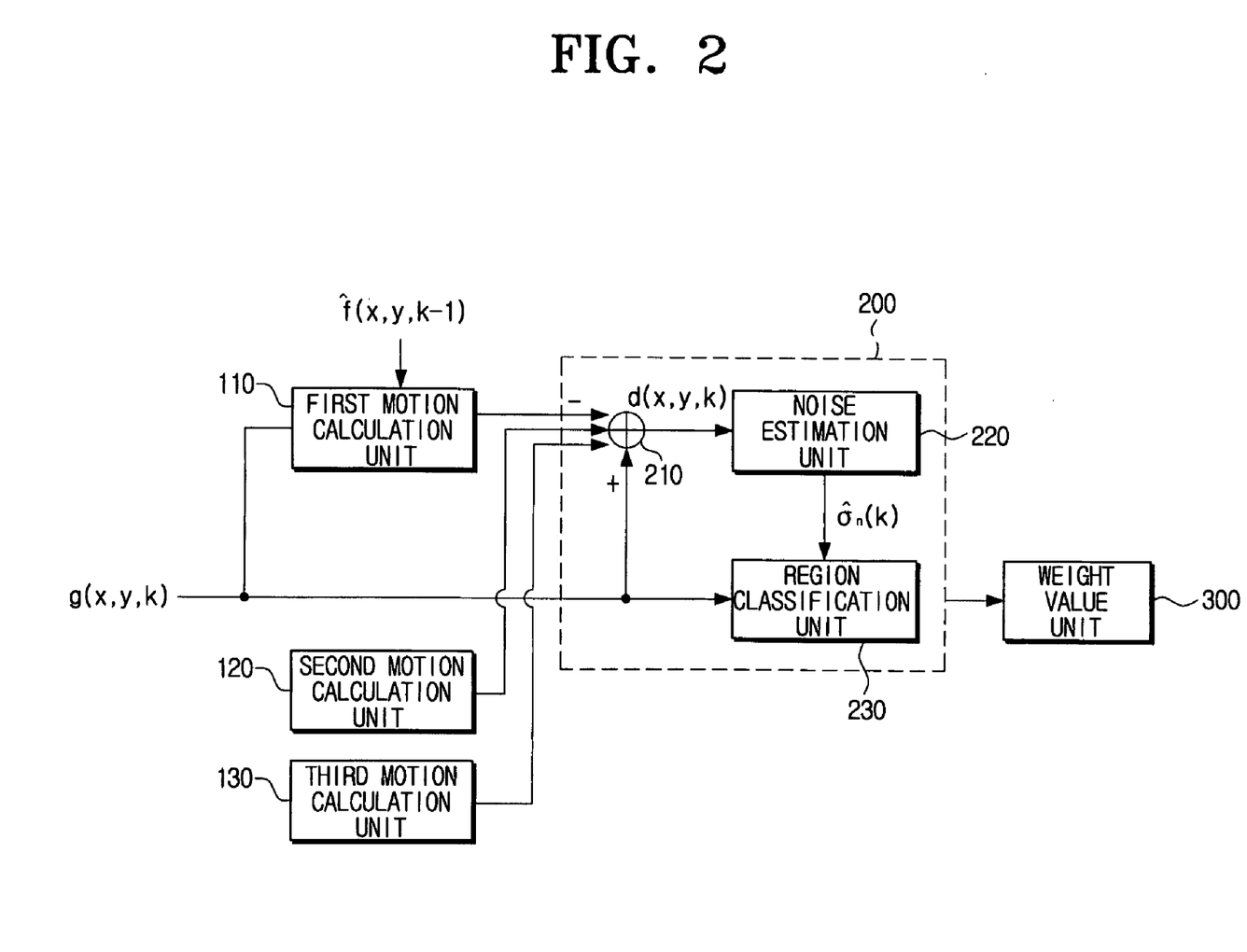
FIG. 2 is a block diagram for showing a classification part of FIG. 1.

FIG. 1 is a block diagram for showing a display device using a spatio-temporal noise removal method using block classification according to an embodiment of the present invention. Further, FIG. 2 is a block diagram for showing the classification part 200 of FIG. 1.

A display device using a spatio-temporal noise removal method using block classification according to the present invention removes noise from a third field by using the first, second, and third fields continuously inputted in time. Here, the first and second fields are noise-removed fields, and the third filed is a noise-carrying field. In FIG. 1, g(x,y,k) denotes a noise-carrying third field, f̂(x,y,k−1) denotes a noise-removed second field (or second noise-removed field), and f̂(x,y,k−2) denotes a noise-removed first field (or first noise-removed field).

In FIG. 1, the display device using the spatio-temporal noise removal method using block classification according to the present invention has a first motion calculation unit 110, a second motion calculation unit 120, a third motion calculation unit 130, a classification part 200, a weight value unit 300, a spatio-temporal filter 400, a temporal filter 400, and an arithmetic logic unit 600.

The first, second, and third motion calculation units 110, 120, and 130 generate motion-compensated fields by using a first noise-removed field, a second noise-removed field, and a third field. The first motion calculation unit 110 generates a motion-compensated field, that is, a first motion-compensated field, $$\hat{f}_1^{mc}(x, y, k),$$

by using the third field for noise removal and a noise-removed second field. Here, the first motion-compensated field corresponds to a field identical in time to the third field.

Further, the second motion calculation unit 120 generates a motion-compensated field, that is, a second motion-compensated field, $$\hat{f}_1^{mc}(x, y, k-1),$$

by using the first noise-removed field and the second noise-removed field. The second motion-compensated field corresponds to a field identical in time to the second field. Further, the third motion calculation unit 130 generates a motion-compensated field, that is, a third motion-compensated field, $$\hat{f}_2^{mc}(x, y, k),$$

by using the second motion-compensated field and the third noise-carrying field. Here, the third motion-compensated field corresponds to a field identical in time to the third field as in the first motion-compensated field.

The first and second noise-removed fields used in the first, second, and third motion calculation units 110, 120, and 130 are output values of the arithmetic logic unit 600, which are noise-removed fields according to the present invention.

The classification part 200 classifies every block of the third field into a uniform region having similar pixel values in a block and a non-uniform region having non-similar pixel values in a block, by using the third field and any of the first and second motion-compensated fields. Description is made in detail on operations of the classification part 200. That is, the classification part 200 has an adder 210, a noise estimation unit 220, and a region classification unit 230. The adder 210 generates a difference image by calculating a pixel value difference between the third field and the first motion-compensated field being an output value of the first motion calculation unit 110. Additionally, the adder 210 can generate a difference image by using the third motion-compensated field being an output value of the third motion calculation unit 130 and the third field. Hereinafter, description will be made on how the first motion-compensated field is used, for an example.

The adder 210 can generate a difference image by using Equation 1 as below.

$$d(x, y, k) = g(x, y, k) - \hat{f}_1^{mc}(x, y, k),$$ [Equation 1]

in here, d(x,y,k) denotes a difference image as an output value of the adder 210, g(x,y,k) denotes a third noise-carrying field, $$\hat{f}_1^{mc}(x, y, k)$$

denotes a first motion-compensated field, and (x,y,k) denotes a pixel position. As shown in Equation 1, a difference image can be generated through calculating a difference between a pixel value of the third field and a pixel value of the first motion-compensated field.

The difference image contains noise and motion errors. The difference image is generated through calculating a pixel value difference between the third field and the first motion-compensated field which is identical in time to the third field and generated by using the second and third noise-removed fields, so the non-uniform region such as an edge region of the third field can contain noise as well as motion errors.

The noise estimation unit 220 divides a difference image generated from the adder 210 into blocks of a certain size, calculates a variance value over every block, and estimates noise, $\hat{\sigma}_n(k)$, based on the calculated variance values. The noise estimation unit 220 generates a histogram based on the calculated variance values, and estimates as noise a variance value having the maximum frequency. Since an image is mostly formed with uniform regions, a region having variance values lower than a variance value having the maximum frequency can be decided as a uniform region. The uniform region in a difference image does not contain motion errors, unlike a non-uniform region such as an edge region, but contains noise. Thus, the noise estimation unit 220 estimates as noise the variance values of a uniform region containing the variance value having the maximum frequency.

The region classification unit 230 compares a variance value calculated over each block with estimated noise, and classifies every block into the uniform region and the non-uniform region. Noise, as well as a block of a difference image containing motion errors, can have a relatively high variance value, and a block of a difference image containing only noise has a low variance value. Thus, the region classification unit 230 can classify a block having a variance value higher than the estimated noise into non-uniform region such as an edge region having non-similar pixel values in the block, and can classify a block having variance values lower than the estimated noise into a uniform region containing only noise.

The weight value unit 300 inputs noise estimated by the classification part 200 and a variance value σij calculated over each block, and generates a weight value w to be applied to the spatio-temporal filter 400 and the temporal filter 500. The weight value unit 300 generates a weight value in order for relatively a high weight value to be set to an output value of the spatio-temporal filter 400 if a block of the third field is a uniform region, and, if a block of the third field is a non-uniform region, generates a weight value in order for relatively a high weight value to be set to an output value of the temporal filter 500.

Specifically, if a variance value calculated over every block of a difference image is lower than the estimated noise, that is, if an arbitrary block of the third field is a uniform region, the weight value unit 300 generates a weight value w of 0. However, if the calculated variance value is two times higher than the estimated noise, that is, if an arbitrary block of the third field is a non-uniform region, the weight value unit 300 generates a weight value w of 1.

Further, if a variance value calculated over every block of a difference image is higher than estimated noise or lower than twice the estimated noise, the weight value unit 300 decides a weight value w of which value is proportional to a variance value calculated over every block. That is, the weight value w is decided to be closer to 0 as the variance value calculated over every block has a value similar to the estimated noise, and the weight value w is decided to be closer to 1 as the variance value calculated over every block has a value similar to twice the estimated noise.

The spatio-temporal filter 400 carries out the spatial filtering and then the temporal filtering over the first motion-compensated field, the third motion-compensated field, and the third field, respectively, based on the spatially-filtered values, so as to carry out the spatio-temporal filtering. In here, the spatio-temporal filter 400 can be a Linear Minimum Mean Square Error (LMMSE) filter. The spatio-temporal filter 400 carries out the spatial filtering over the first motion-compensated field, the third motion-compensated field, and the third field, respectively, adds the spatially-filtered values thereof, and carries out the spatio-temporal filtering over every block of the third field.

The temporal filter 500 performs the temporal filtering by using a variance value calculated over every block of the first motion-compensated field, third motion-compensated field, and third field, thereby removing noise from the third field. In here, the temporal filter 500 can be the Linear Minimum Mean Square Error (LMMSE) filter.

The arithmetic logic unit 600 applies a weight value of the weight value unit 300 to an output value of the spatio-temporal filter 400 and an output value of the temporal filter 500, respectively, and adds the weight value-applied output values of the spatio-temporal filter 400 and the temporal filter 500. Thus, the arithmetic logic unit 600 can express the noise-removed third field, which is an output value, in Equation 2 as below.

$$f(x,y,k) = w \times f_t(x,y,k) + (1-w) \times f_{s-t}(x,y,k),$$ [Equation 2]

in here, f̂(x,y,k) denotes a third noise-removed field which is an output value of the arithmetic logic unit 600, and w and (1−w) denote a weight value set to an output value of the temporal filter 500 and a weight value set to an output value of the spatio-temporal filter 400, respectively. Further, $f_t(x,y,k)$ denotes an output value of the temporal filter 500, $f_{s-t}(x,y,k)$ denotes an output value of the spatio-temporal filter 400, and (x,y,k) denotes a pixel position.

As expressed in Equation 2, the third noise-removed field calculated by the arithmetic logic unit 600 is a soft-switching value of an output value of the temporal filter 500 and an output value of the spatio-temporal filter 400. If a block of the third field is a uniform region, a weight value of 0 is applied to the output value of the spatio-temporal filter 400 and a weight value of 1 is applied to the output value of the temporal filter 500, so the output value of the temporal filter 500 becomes an output value of the arithmetic logic unit 600.

However, if a block of the third field is a non-uniform region, a weight value to an output value of the spatio-temporal filter 400 becomes close to '1', and a weight value applied to an output value of the temporal filter 500 becomes close to '0'. Thus, the arithmetic logic unit 600 outputs an addition value of an output value of the temporal filter 500 and an output value of the spatio-temporal filter 400 taking an output value of the spatio-temporal filter 400 into more account than an output value of the temporal filter 500.

The third noise-removed field outputted by the arithmetic logic unit 600 is used for noise removal from fourth and fifth noise-carrying fields which are subsequently inputted.

Figure 3:
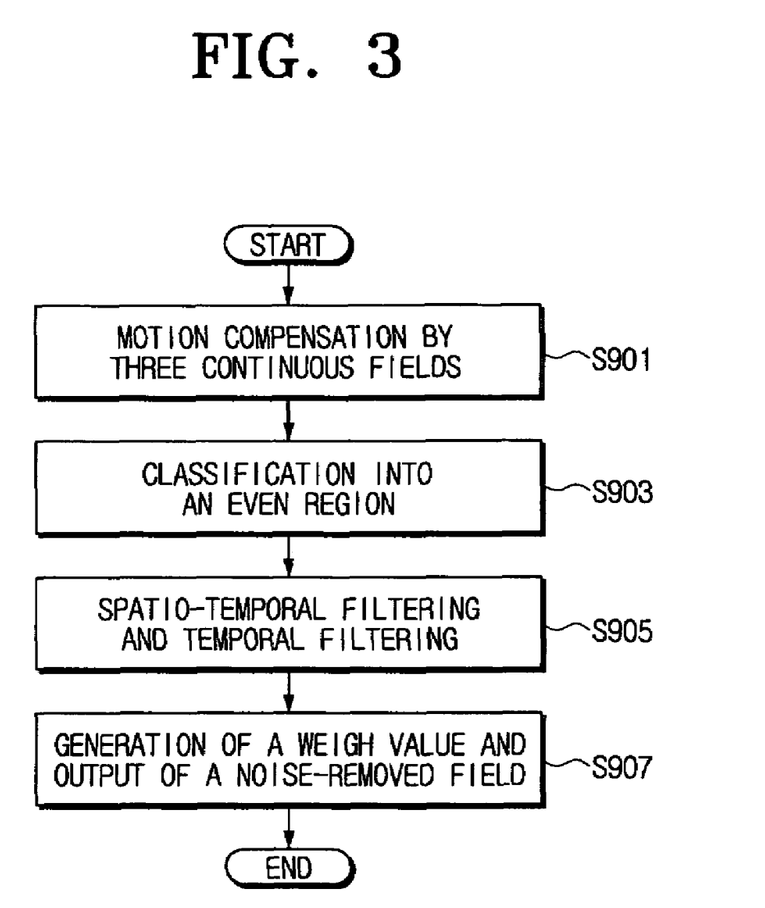
FIG. 3 is a flow chart for explaining a spatio-temporal noise removal method using the block classification according to an embodiment of the present invention.

FIG. 3 is a flow chart for explaining a spatio-temporal noise removal method using block classification according to an embodiment of the present invention. Description will be made on a method for removing noise from the third field, using the first, second, and third fields which are continuously inputted, for an example.

In FIG. 3, the first, second, and third fields, which are continuously inputted, are used for generation of a motion-compensated field (S901). In here, the first and second fields are noise-removed fields, and the third field is a field for noise removal. The third field and the second noise-removed field are used for generation of the first motion-compensated field identical in time to the third field which is a motion-compensated field.

Further, the first and second noise-removed fields are used for generation of the second motion-compensated field identical in time to the second field which is a motion-compensated field, and the second motion-compensated field and the third noise-carrying field are used for generation of the third motion-compensated field identical in time to the third field which is a motion-compensated field.

Next, a generated motion-compensated image is used for classification of the blocks of the third field into a uniform region having similar pixel values in a block and a non-uniform region having non-similar pixel values (S903). Specifically, the motion-compensated image can be the first motion-compensated field or the third motion-compensated field. Hereinafter, description will be made on classification in which the first motion-compensated field and the third field are used for classification of the blocks of the third field into the uniform region and the non-uniform region.

Pixel value differences between the first motion-compensated field and the third field are calculated for generation of a difference image. In here, the difference image can contain noise and motion errors of the third field. Out of the difference image, the uniform region, which has no motion errors, contains only noise.

Equation 3 as below can be used to calculate the difference image.

$$d(x, y, k) = g(x, y, k) - \hat{f}_1^{mc}(x, y, k),\quad \text{[Equation 3]}$$

here, d(x,y,k) denotes a difference image, g(x,y,k) denotes the third field, and $$\hat{f}_1^{mc}(x, y, k)$$

denotes the first motion-compensated field, and (x,y,k) denotes a pixel position.

Further, a variance value of every block is calculated out of the difference image shown in Equation 3, and noise contained in the third field is estimated. A histogram with the variance value calculated for every block is generated in which the variance value having the maximum frequency is estimated as noise. Since it can be considered that most regions of one field correspond to a uniform region, the variance value having the maximum frequency is decided to be a variance value of the uniform region. Since the uniform region of a difference image does not contain motion errors but only noise, the variance value having the maximum frequency is estimated to be noise of the third field.

Further, the estimated noise and the variance value over every block are compared to each other, blocks having variance values higher than the estimated noise are classified into the non-uniform region, and blocks having variance values lower than the estimated noise are classified into the uniform region. The block having a variance value higher than the estimated noise is a block having motion errors as a region such as edges, which can be decided as the non-uniform block.

Next, the spatio-temporal filtering and the temporal filtering are performed over the third field (S905). Every block of the third field is filtered. Since the pixel values in an arbitrary block are similar to one another when the block is the uniform region, the information on the third field and the information on the first and second fields are used together for the spatio-temporal filtering over the uniform region, which can reduce flickering. However, since pixel values in an arbitrary block are not similar when the block is the non-uniform region, the first and second field information is used for filtering over the non-uniform region, which can reduce flickering. Thus, a weight value is assigned to a spatio-temporal-filtered value and a temporal-filtered value depending on whether an arbitrary block is the uniform region or the non-uniform region, which can reduce noise from the third field for enhancement of a noise removal effect.

Equation 4 can be used for the spatio-temporal filtering for noise removal from an arbitrary block of the third field.

$$\hat{f}_{s-t}(x, y, k) = \frac{1}{3}\{\hat{f}_1^s(x, y, k) + \hat{f}_2^s(x, y, k) + \hat{f}^s(x, y, k)\},\quad \text{[Equation 4]}$$

here, $$\hat{f}_{s-t}(x, y, k)$$

denotes an output value of the spatio-temporal filter, $$\hat{f}_1^s(x, y, k), \hat{f}_2^s(x, y, k), \text{ and } \hat{f}^s(x, y, k)$$

denote spatially-filtered values over arbitrary blocks of the first motion-compensated field, the third motion-compensated field, and the third field, respectively, and (x,y,k) denotes a pixel position of an arbitrary block of the first motion-compensated field, the third motion-compensated field, and the third field.

Further, Equation 5 below can be used for temporal filtering for noise removal over an arbitrary block of the third field.

$$\hat{f}_t(x, y, k) = \quad \text{[Equation 5]}$$

$$\frac{\sigma_f^2(x, y, k)}{\sigma_f^2(x, y, k) + \sigma_n^2(x, y, k)} \{g(x, y, k) - E[g(x, y, k)]\} +$$

$$E[g(x, y, k)],$$

here, $$E[g(x, y, k)] = \frac{1}{3}\left(g(x, y, k) + \hat{f}_1^{mc}(x, y, k) + \hat{f}_2^{mc}(x, y, k)\right),$$

$\hat{f}_t(x, y, k)$ denotes a temporal-filtered value, g(x,y,k) the third field, $\hat{f}_1^{mc}(x, y, k)$ the first motion-compensated field, $\hat{f}_2^{mc}(x, y, k)$ the third motion-compensated field, (x,y,k) a pixel position in an arbitrary block, $\sigma_n^2$ estimated noise, and $\sigma_f^2$ a variance value of a filtered block.

Next, the estimated noise and a variance value calculated over every block of a difference image are used for generation of a weight value to be applied to a spatiotemporal-filtered value and a temporal-filtered value, and the third noise-removed field is outputted (S907).

If a block in the third field for noise removal is classified as a uniform region, a weight value is generated in order for the spatio-temporal-filtered value to be relatively more considered, and, if classified as a non-uniform region, a weight value is generated in order for the temporal-filtered value to be relatively more considered.

Further, Equation 6 below can be used to calculate the third noise-removed field.

$$f(x,y,k) = w \times f_t(x,y,k) + (1-w) \times f_{s-t}(x,y,k), \quad \text{[Equation 6]}$$

in here, f(x,y,k) denotes the third noise-removed field, w and (1−w) denote a weight value applied to a temporal-filtered value and a weight value applied to a spatio-temporal-filtered value, respectively, $f_t(x,y,k)$ denotes a temporal-filtered value, $f_{s-t}(x,y,k)$ denotes a spatio-temporal-filtered value, and (x,y,k) a pixel position.

Thus, if a variance value calculated over every block of a difference image is lower than the estimated noise, that is, if the arbitrary block of the third field is a uniform region, the weight value becomes a 0, so that only a spatio-temporal-filtered value is outputted.

However, if a variance value calculated over every block of a difference image is higher than twice the estimated noise, that is, if an arbitrary block of the third field is a non-uniform region, the weight value becomes a 1, so only a temporal-filtered value is outputted.

If a variance value calculated over every block of a difference image is higher than the estimated noise but lower than twice the estimated noise, a weight value is decided to be proportional to a variance value calculated over every block. That is, as a variance value calculated over every block has a value more similar to the estimated noise, a weight value is decided to be closer to 0, and, as a variance value calculated over every block has a value more similar to twice the estimated noise, a weight value is decided to be closer to 1.

Therefore, depending on whether an arbitrary block is a uniform region after a noise-carrying field is divided into blocks, the spatio-temporal filtering or the temporal filtering is performed, and a spatio-temporal-filtered value and a temporal-filtered value are added, so noise can be more effectively removed than when only the temporal filtering is performed or only the spatio-temporal filtering is performed.

As aforementioned, the present invention can adaptively perform the spatiotemporal filtering depending on a region of an input image, thereby effectively removing noise contained in the image.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A display device for displaying images by removing noise from a third field by using a first noise-removed field, a second noise-removed field, and the third field, comprising:
   a motion calculation part adapted to generate a first motion-compensated field by using the third field and the second noise-removed field, generate a second motion-compensated field by using the first and second noise-removed fields, and generate a third motion-compensated field by using the second motion-compensated field and the third field;
   a classification part adapted to generate blocks of the third field into a uniform region and a non-uniform region based on a variance value of a generated difference image by using the third field and any of the first and second motion-compensated fields;
   a temporal filter adapted to perform temporal filtering over every block of the third field based on the first and third motion-compensated fields, the third field, and the variance value;
   a spatio-temporal filter adapted to perform spatio-temporal filtering by performing spatial filtering over every block of the first and third motion-compensated fields and the third field, and by performing the temporal filtering over every block of the third field based on the spatially-filtered value; and
   an arithmetic logic unit adapted to output a third noise-removed field by applying a weighted value to the temporal-filtered value and the spatio-temporal-filtered value, respectively, depending on whether a block in the third field is the uniform region or the non-uniform region.

2. The display device as claimed in claim 1, wherein the motion calculation part comprises:
   a first motion calculation unit adapted to generate the first motion-compensated field by using the third field and the second noise-removed field;
   a second motion calculation unit adapted to generate the second motion-compensated field by using the first and second noise-removed fields; and
   a third motion calculation unit adapted to generate the third motion-compensated field by using the second motion-compensated field and the third field.

3. The display device as claimed in claim 1, wherein the classification part includes:
- an adder adapted to generate a difference image by calculating a pixel value difference between the third field and any of the first and second motion-compensated fields;
- a noise estimation unit adapted to estimate, as noise, a variance value having a maximum frequency after calculating a variance value over every block of the difference image; and
- a region classification unit adapted to classify, as the uniform region, a block having a variance value higher than the estimated noise.

4. The display device as claimed in claim 1, further comprising a weight value unit adapted to generate a weight value in order for an output value of the spatio-temporal filter to be taken into more account than an output value of the temporal filter if an arbitrary block of the third field is the uniform region, and generate a weight value in order for the output value of the temporal filter to be taken into more account than the output value of the spatio-temporal filter.

5. The display device as claimed in claim 1, wherein the arithmetic logic unit outputs the third noise-removed field by using an equation as below:

$$f(x,y,k) = w \times f_t(x,y,k) + (1-w) \times f_{s-t}(x,y,k),$$

here, f(x,y,k) denotes the third noise-removed field, w and (1−w) denote a weight value applied to a temporal-filtered value and a weight value applied to a spatio-temporal-filtered value, respectively, $f_t(x,y,k)$ denotes an output value of the temporal filter, and $f_{s-t}(x,y,k)$ denotes an output value of the spatio-temporal filter.

6. The display device as claimed in claim 1, wherein the spatio-temporal filter performs the spatio-temporal filtering over every block of the third field by using an equation as below:

$$\hat{f}_{s-t}(x, y, k) = \frac{1}{3}\{\hat{f}_1^s(x, y, k) + \hat{f}_2^s(x, y, k) + \hat{f}^s(x, y, k)\},$$

here, $\hat{f}_{s-t}(x,y,k)$ denotes an output value of the spatio-temporal filter, $$\hat{f}_1^s(x, y, k), \hat{f}_2^s(x, y, k), \text{ and } \hat{f}^s(x, y, k)$$

denote spatially-filtered values over the first motion-compensated field, the third motion-compensated field, and the third field, respectively, and (x,y,k) denotes a pixel position.

7. The display device as claimed in claim 1, wherein the temporal filter performs the temporal filtering over every block of the third field by using an equation as below:

$$\hat{f}_t(x, y, k) = \frac{\sigma_f^2(x, y, k)}{\sigma_f^2(x, y, k) + \sigma_n^2(x, y, k)} \{g(x, y, k) - E[g(x, y, k)]\} + E[g(x, y, k)], \text{ here,}$$

$$E[g(x, y, k)] = \frac{1}{3}(g(x, y, k) + \hat{f}_1^{mc}(x, y, k) + \hat{f}_2^{mc}(x, y, k)),$$

$$\hat{f}_t(x, y, k)$$

denotes the temporal-filtered value, g(x,y,k) the third field, $$\hat{f}_1^{mc}(x, y, k)$$

the first motion-compensated field, $$\hat{f}_2^{mc}(x, y, k)$$

the third motion-compensated field, (x,y,k) a pixel position in an arbitrary block, $\sigma_n^2$, a variance value of the uniform region, and $\sigma_f^2$ a variance value of a filtered block.

8. The display device as claimed in claim 1, wherein the spatio-temporal filter and the temporal filter are a Linear Minimum Mean Square Error (LMMSE) filter.

9. A spatio-temporal noise removal method using block classification for noise removal from a third field by using a first noise-removed field, a second noise-removed field, and the third field, comprising:
- generating a first motion-compensated field by using the third field and the second noise-removed field, generating a second motion-compensated field by using the first and second noise-removed fields, and generating a third motion-compensated field by using the second motion-compensated field and the third field;
- classifying blocks of the third field into a uniform region and a non-uniform region based on a variance value of a generated difference image by using the third field and any of the first and second motion-compensated fields;
- performing temporal filtering over every block of the third field based on the first and third motion-compensated fields, the third field, and the variance value;
- performing spatio-temporal filtering by performing spatial filtering over every block of the first and third motion-compensated fields and the third field and performing the temporal filtering over the every block of the third field based on the spatially-filtered value; and
- outputting a third noise-removed field by applying a weighted value to the temporal-filtered value and the spatio-temporal-filtered value, respectively, depending on whether a block in the third field is the uniform region or the non-uniform region.

10. The spatio-temporal noise removal method as claimed in claim 9, wherein generating the motion-compensated field comprises:
- generating the first motion-compensated field by using the third field and the second noise-removed field;
- generating the second motion-compensated field by using the first and second noise-removed fields; and
- generating the third motion-compensated field being a motion-compensated field by using the second motion-compensated field and the third field.

11. The spatio-temporal noise removal method as claimed in claim 9, wherein classifying blocks of the third field comprises:
- generating a difference image by calculating a pixel value difference between the third field and any of the first and second motion-compensated fields;

estimating as noise a variance value having a maximum frequency after calculating a variance value over every block of the difference image; and classifying as the uniform region a block having a variance value larger than the estimated noise.

12. The spatio-temporal noise removal method as claimed in claim 9, further comprising:

generating a weight value in order for an output value of the spatio-temporal filter to be taken into more account than an output value of the temporal filter if an arbitrary block of the third field is the uniform region, and generating a weight value in order for the output value of the temporal filter to be taken into more account than the output value of the spatio-temporal filter.

13. The spatio-temporal noise removal method as claimed in claim 9, wherein the third noise-removed field is calculated by an equation as below:

$$\hat{f}(x,y,k) = w \times f_t(x,y,k) + (1-w) \times f_{s-t}(x,y,k),$$

in here, $\hat{f}(x,y,k)$ denotes the third noise-removed field, w and (1−w) denote a weight value applied to a temporal-filtered value and a weight value applied to a spatio-temporal-filtered value, respectively, $f_t(x,y,k)$ denotes a temporal-filtered value, and $f_{s-t}(x,y,k)$ denotes a spatio-temporal-filtered value.

14. The spatio-temporal noise method as claimed in claim 9, wherein in performing the spatio-temporal filtering over every block of the third field, an equation, as below, is used:

$$\hat{f}_{s-t}(x,y,k) = 1/3 \{\hat{f}^s_1(x,y,k) + \hat{f}^s_2(x,y,k) + \hat{f}^s(x,y,k)\}$$

here, $\hat{f}_{s-t}(x,y,k)$ denotes a spatio-temporal-filtered value, $$\hat{f}^s_1(x,y,k), \hat{f}^s_2(x,y,k), \text{ and } \hat{f}^s(x,y,k)$$

denote spatially-filtered values over the first motion-compensated field, the third motion-compensated field, and the third field, respectively, and (x,y,k) denotes a pixel position.

15. The spatio-temporal noise removal method as claimed in claim 9, wherein in performing the temporal filtering over every block of the third field, an equation, as below, is used:

$$\hat{f}_t(x,y,k) = \frac{\sigma_f^2(x,y,k)}{\sigma_f^2(x,y,k) + \sigma_n^2(x,y,k)}$$

$$\{g(x,y,k) - E[g(x,y,k)]\} +$$

$$E[g(x,y,k)], \text{ here,}$$

$$E[g(x,y,k)] = \frac{1}{3}(g(x,y,k) + \hat{f}^{mc}_1(x,y,k) +$$

$$\hat{f}^{mc}_2(x,y,k)),$$

$$\hat{f}_t(x,y,k)$$

denotes the temporal-filtered value, g(x,y,k) the third field, $$\hat{f}^{mc}_1(x,y,k)$$

the first motion-compensated field, $$\hat{f}^{mc}_2(x,y,k)$$

the third motion-compensated field, (x,y,k) a pixel position in an arbitrary block, $\sigma_n^2$ a variance value of the uniform region, and $\sigma_f^2$ a variance value of a filtered block.

* * * * *